United States Patent
Dandridge

(10) Patent No.: US 6,338,171 B1
(45) Date of Patent: Jan. 15, 2002

(54) SINK HUGGER

(76) Inventor: N. Dawn Dandridge, 1205 Moss Ave., Orangeburg, SC (US) 29115

( * ) Notice: Subject to any disclaimer, the term of this patent is extended or adjusted under 35 U.S.C. 154(b) by 0 days.

(21) Appl. No.: 09/609,692

(22) Filed: Jul. 5, 2000

(51) Int. Cl.[7] .............................................. A47K 47/20
(52) U.S. Cl. ...................................... 4/657; 4/DIG. 18
(58) Field of Search ............................ 4/580–583, 655, 4/657, DIG. 18

(56) References Cited

U.S. PATENT DOCUMENTS

| | | | |
|---|---|---|---|
| 2,421,808 A | * 6/1947 | Robertson | 4/657 |
| 3,931,651 A | 1/1976 | Weir | 4/173 |
| 4,336,620 A | 6/1982 | Gresh | 4/639 |
| 4,602,393 A | 7/1986 | Fiveash | 4/580 |
| 4,630,323 A | * 12/1986 | Sage et al. | 4/583 X |
| 4,956,882 A | 9/1990 | Cohn, III | 4/580 |
| 5,136,736 A | 8/1992 | Bishop | 4/641 |
| 5,153,950 A | 10/1992 | Sowers | 4/580 |
| 5,465,436 A | 11/1995 | Bleicher | 4/580 |
| 5,647,073 A | 7/1997 | Dorber, Sr. | 4/657 |
| 5,815,856 A | * 10/1998 | Dore | 4/657 |

* cited by examiner

*Primary Examiner*—Charles E. Phillips
(74) *Attorney, Agent, or Firm*—Flint & Kim, P.A.

(57) ABSTRACT

A removable protective liner for use with a sink mounted in a counter top. The liner comprises a bottom panel of a size conforming with the bottom of the sink, four upstanding side panels which conform with the upstanding walls of the sink and an adjacent portion of its peripheral flange. The side panels and bottom panel are adapted to conform with the configuration of the sink so that the liner completely covers the sink. The liner further includes a side drain having an elevated outer end and a bottom interconnecting with side walls and extending from the elevated outer end to an inner end. The inner end of the side drain is adapted to be engaged with an outer edge of a side panel and to extend over the peripheral flange of the sink.

18 Claims, 4 Drawing Sheets

SINK HUGGER

BACKGROUND OF THE INVENTION

The instant invention is directed to a protective sink hugger primarily intended for use with kitchen sinks but could find use with other types of sinks or tubs.

Tub or sink liners are well known as is illustrated by U.S. Pat. Nos. 3,931,651 to Weir; 4,602,393 to Fiveash; 5,153,950 to Sowers; 5,465,436 to Bleicher; and 5,815,856 to Dore. In the Weir and Sowers patents, a plastic sheet is laid over a bath tub and secured therewith by way of a frame structure. The patent to Bleicher is directed to a disposable plastic sheet liner for use in the medical filed. Again, the liner is secured about the tank rim. The patent to Dore is directed to a sink liner which is formed as a shaped unitary piece having individual extending side members. The liner is formed into and held in the configuration of the sink by hook and loop fasteners. The shapes of the side panels are substantially rectangular.

The instant invention is intended to remove the shortfall of the above constructions by providing a sink liner which protects both the sink and the adjacent counter top, is re-usable and is pleasing to the eye.

An object of the instant invention is the provision of a sink liner which protects the sink from stains, chips, and scratches.

Another object of the invention is the provision of a sink liner which is easily installed and easily removed and stored.

Another object of the invention is the provision of a sink liner having a side drain board which directs water into the sink and away from the counter top.

Another object of the invention is the provision of a sink liner which prevents breakage.

Another object of the invention is a sink liner formed of pliable synthetic having a smooth outer surface.

Another object of the invention is a sink liner which is removable and reusable.

Another object of the invention is the provision of a sink liner which is both functional and attractive.

Another object of the invention is the provision of a sink liner formed of a plurality of components which may be attached into a unitary watertight assembly.

Another object of the invention is a sink liner formed of a heat resistant synthetic material.

SUMMARY OF THE INVENTION

The invention is directed to a removable protective liner for use with a sink which is mounted in a counter top. Normally the sink is substantially rectangular with a bottom, four upstanding walls, and a peripheral flange overlaying adjacent edges of the counter top. The sink may be a double sink.

The liner includes a body having a bottom panel of a size conforming with the bottom of the sink and four upstanding side panels of a size conforming with the respective upstanding walls of the sink and the adjacent portion of the peripheral flange. Each side panel engages with a respective edge of the bottom panel and adjacent side panels at least when the liner is positioned within the sink.

A side drain board is provided for each sink. The side drain board includes raised side and end walls, an elevated outer end, an inner end, and a bottom interconnecting the raised walls and extending from the elevated outer end to the inner end. The inner end of the side drain is engagable with an outer edge of a side panel and formed to extend over the peripheral flange.

In use the liner may be positioned within the sink to completely cover and protects its outer surface. The side drain is connected with the liner body and arranged to cover and protect the adjacent outer surface of the counter top.

The protective liner may be constructed with the bottom panel and the four upstanding side panels formed integral. Alternatively, it may be constructed with the bottom panel and the four upstanding side panels formed as separate and individual members. In this arrangement an edge of each of the four upstanding side panels overlap a respective edge of the bottom panel and adjacent vertical edges are in overlapping position. Securing devices secure the overlapping edges in position. The securing members may be selected from hook and loop members, magnetic components, projection-channel members, and suction cups.

Each of the opposed sides of the upstanding panels are contoured so that adjacent ones overlap along their entire length when positioned within the sink.

The bottom panel includes an opening positioned to overlie the drain hole of the sink. This opening includes a downwardly projecting lip which projects into the drain hole a distance sufficient to prevent seepage. Preferably the projection lip is of a size which provides that it fits snugly into the drain hole.

Attachment members which connect the bottom with the side panels with each other and the side drain with the side panel preferably comprise a shaped projection formed or connected with one edge portion and a shaped receiving channel formed or connected with the other edge portion. The projection is designed to pressure fit into the channel forming a watertight connection.

The material forming the liner may have its exposed surfaces contain design schemes. The schemes may be complete for each panel or be a continuous scheme. The panels are formed preferably of a heat resistant, pliable, non-porous synthetic material which may comprise a flexible synthetic or rubber compound.

A removable protective liner in combination with a sink mounted in a counter top. The sink is substantially rectangular and has a bottom with a drain hole, four upstanding walls and a peripheral flange overlaying adjacent edges of the counter top. The combination comprises a body positioned in the sink having a bottom panel located in the sink bottom configured to substantially conform with the sink bottom. The bottom panel includes fastening members secured with its upper surface and extending along each edge and a drain opening aligned with the drain hole of the sink. There are four side panels with each side panel covering a respective wall of the upstanding walls of the sink. Each panel includes a lower edge carrying a fastening member which is adapted to engage with a respective one of the edge fastening members of the bottom panel. The fastening members when engaged form a watertight seal between the side panels and the bottom panel.

Each side panel includes a pair of opposed contoured side edges, each of which carries a fastening member. The panels are arranged with opposed edges in overlaying positions with the fastening members when engaged forming a watertight seal.

Each side panel includes an upper end which overlays the sink flange and an adjacent portion of the counter. The upper end includes attachment members which removably secure it with the sink flange.

There may be suction members provided to engage with the upper walls and bottom of the sink. Also, the attachment member may comprise magnetic connectors or strips, or hook and loop connectors or any other suitable releasable connector which provides a suitable seal for preventing water seepage.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
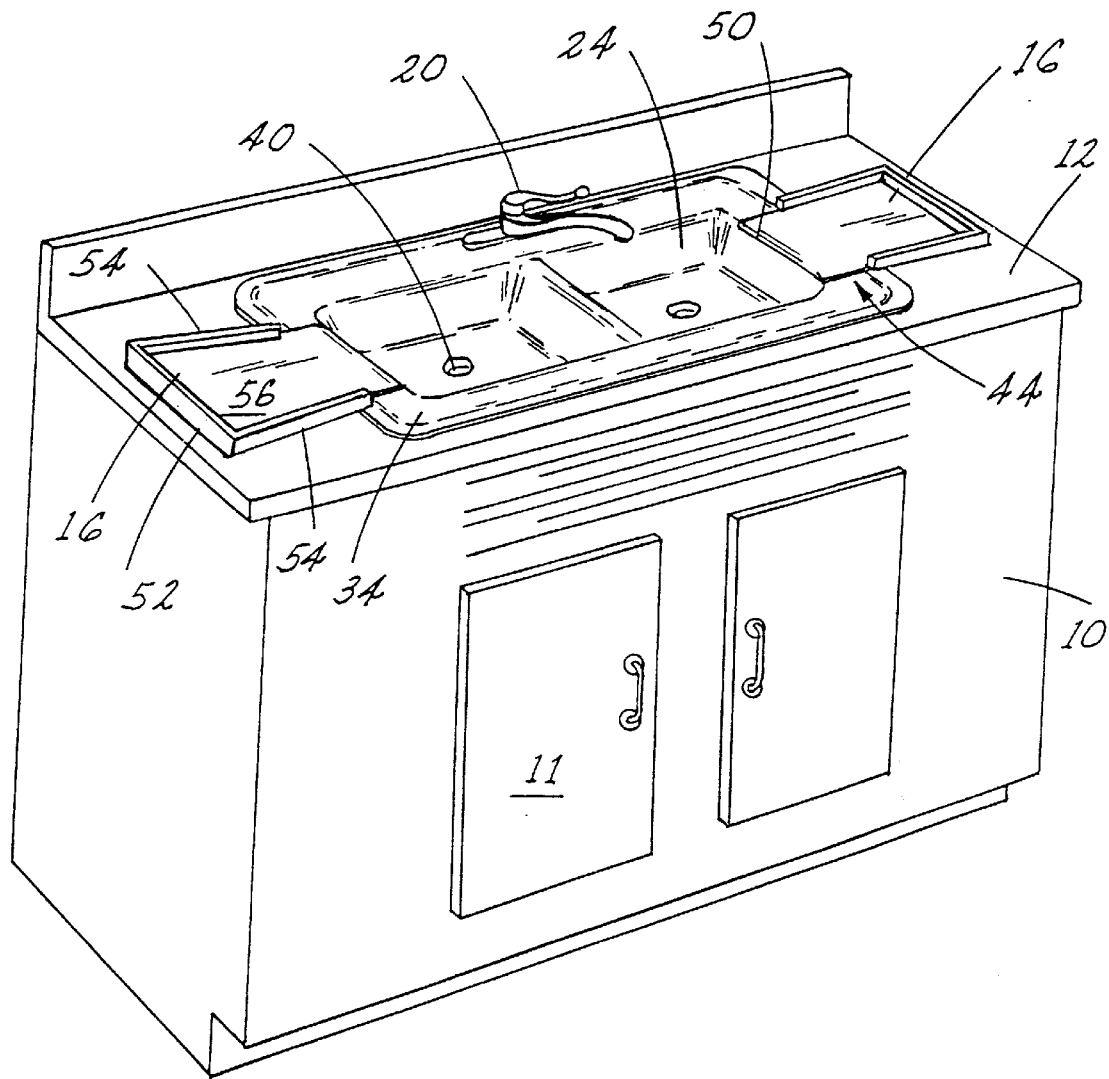
FIG. 1 is a perspective view of a double sink mounted in a counter top covered with the sink liner of the invention.

Turning now to the drawings, FIG. 1 shows the combination of a cabinet 10 having the usual doors 11 and counter 12 with a back stop. A double sink is shown seated in counter 12.

Figure 2:
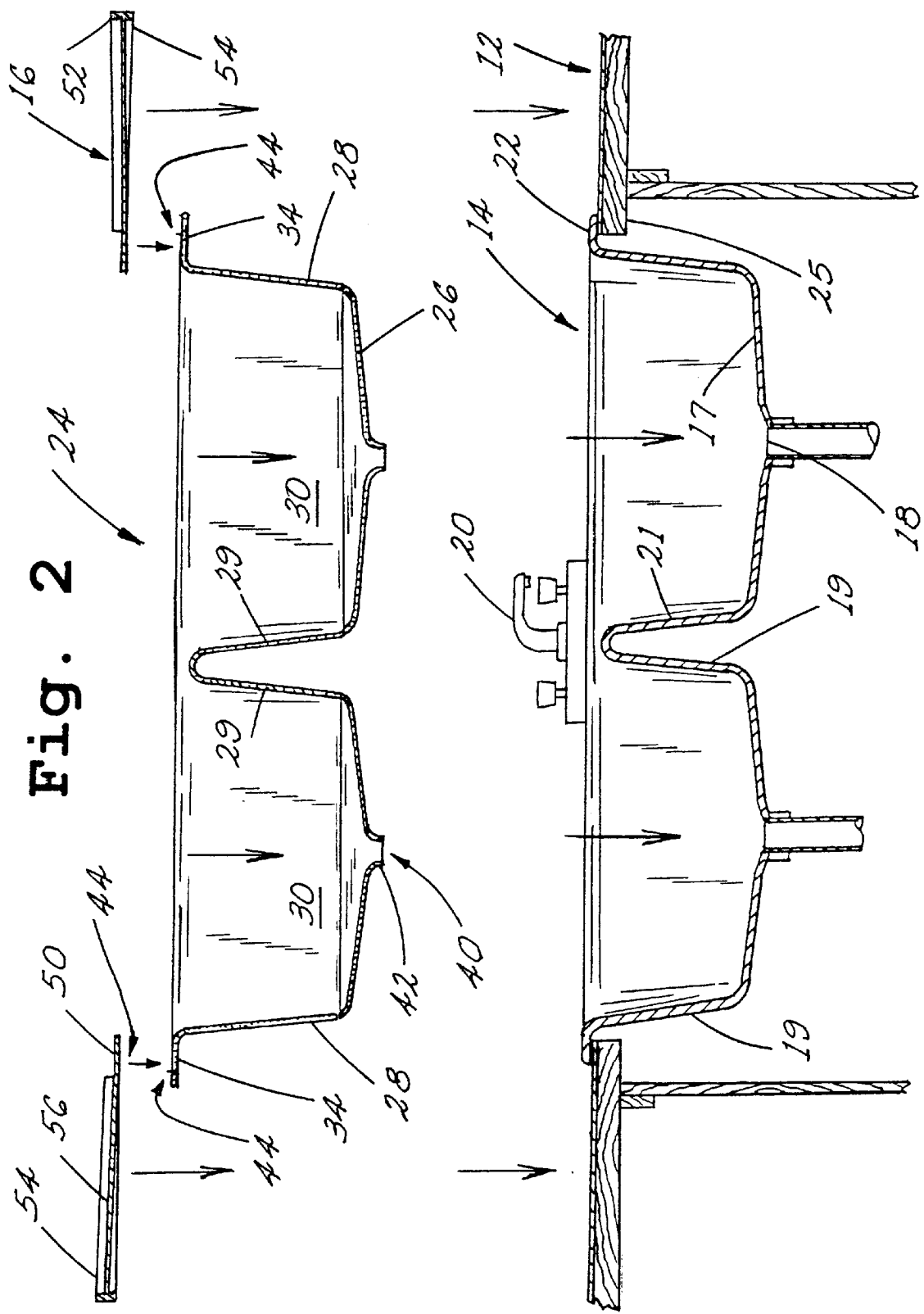
FIG. 2 is an exploded sectional side view of a sink mounted in a counter with the sink liner and side drain positioned thereabove.

FIG. 2 shows, in section, sink 14 which includes a pair of bottom 17, outer side walls 19 which include a flanged upper end. Flange 22 is designed to overlay the edge position 25 of counter 12 to support sink 14 in position. Inner side walls 21 of the double sink interconnect below the level of the sink top or below flange 22 as is shown in the drawing. Each sink of the double sink includes a drain hole 18 which connects with a usual drain pipe in a usual manner.

Fitted over sink 14 is an arrangement of the sink liner of the invention. Viewing now FIGS. 1 and 2, liner 24 is molded into a shape substantially corresponding to that of sink 14. The liner consists of a body having vertical side panels which unite with a bottom in which opening 40 is formed. Liner 24 is positioned over sink 14 so that liner bottom 26 overlays sink bottom 17, outer side panels 28, 30 overlay sink walls 19. A flared upper edge 34 of side panels 28, 30 is shown extending outwardly over flange 22 and adjacent portions of counter top 12. A pair of side drain boards 16 are shown in FIG. 1 connected with outer side panels 28 best seen in FIG. 2. Inner side panels 29 interconnect at their upper ends and are designed to overlay inner walls 21.

Liner 24 is formed of a pliable molded plastic or rubber material which has been configured to fit snugly into each sink of double sink 14 as earlier stated.

Liner 24 includes a pair of openings 40 which are aligned with drain holes 18. Openings 40 includes a lip 42 which protrudes below the bottom of liner 24 and are adapted to extend into drain opening 18 when the liner is positioned in sink 14 to insure that seepage does not occur around the drain.

Figure 5:
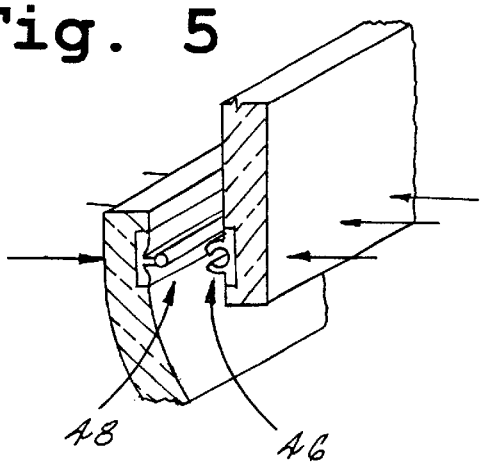
FIG. 5 is a sectional perspective view of a panel engaging member in separated position; and, FIG. 6 is similar to FIG. 5 showing the engaging member engaged.
Figure 6:
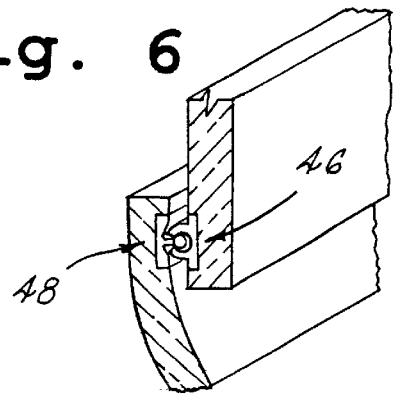

Flared edges 34 along opposed sides of liner 24 have securing members 44 affixed with their upper surface. Members 44 may comprise an elongated receiving member 46 or an elongated protruding member 48 as best shown in FIGS. 5 and 6.

Side drain board 16 is shown positioned above flared edge 34. The lower surface of inner edge 50 of the side drain board is also provided with a securing member 44. The drain board also includes a pair of raised vertical sides 54, a raised outer edge 52, and a bottom 56. As clearly shown in FIG. 2, bottom 56 is affixed with sides 54 at an incline extending downward from outer edge 52 toward inner edge 50.

In an alternative arrangement one or both of the side boards 16 may be designed to also function as a cutting board. Other than the cutting surface, these drain boards are constructed as described above.

When liner 24 is positioned over sink 14, its appearance is substantially that shown in FIG. 1. It should be noted that inner edges 50 of side drain board 16 are engaged with flared edges 34 by way of attachment members 44. The inclination of the bottom of drain board 16 along with the engagement of the attachment members directs all water and liquids deposited onto the drain board into the sink protecting the counter from staining.

Figure 3:
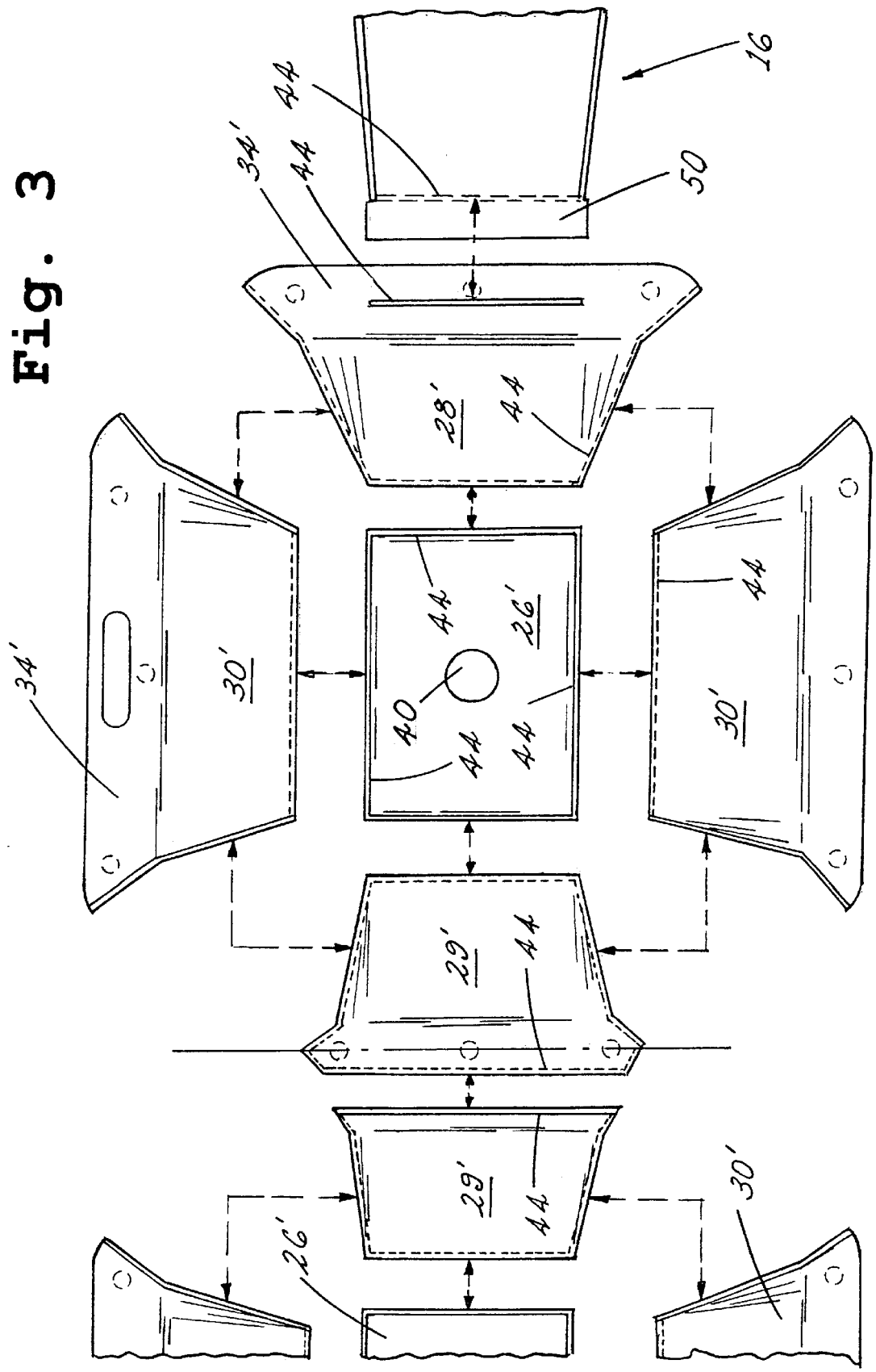
FIG. 3 is an exploded top view of a second arrangement of the sink liner of the invention with the various components separated.
Figure 4:
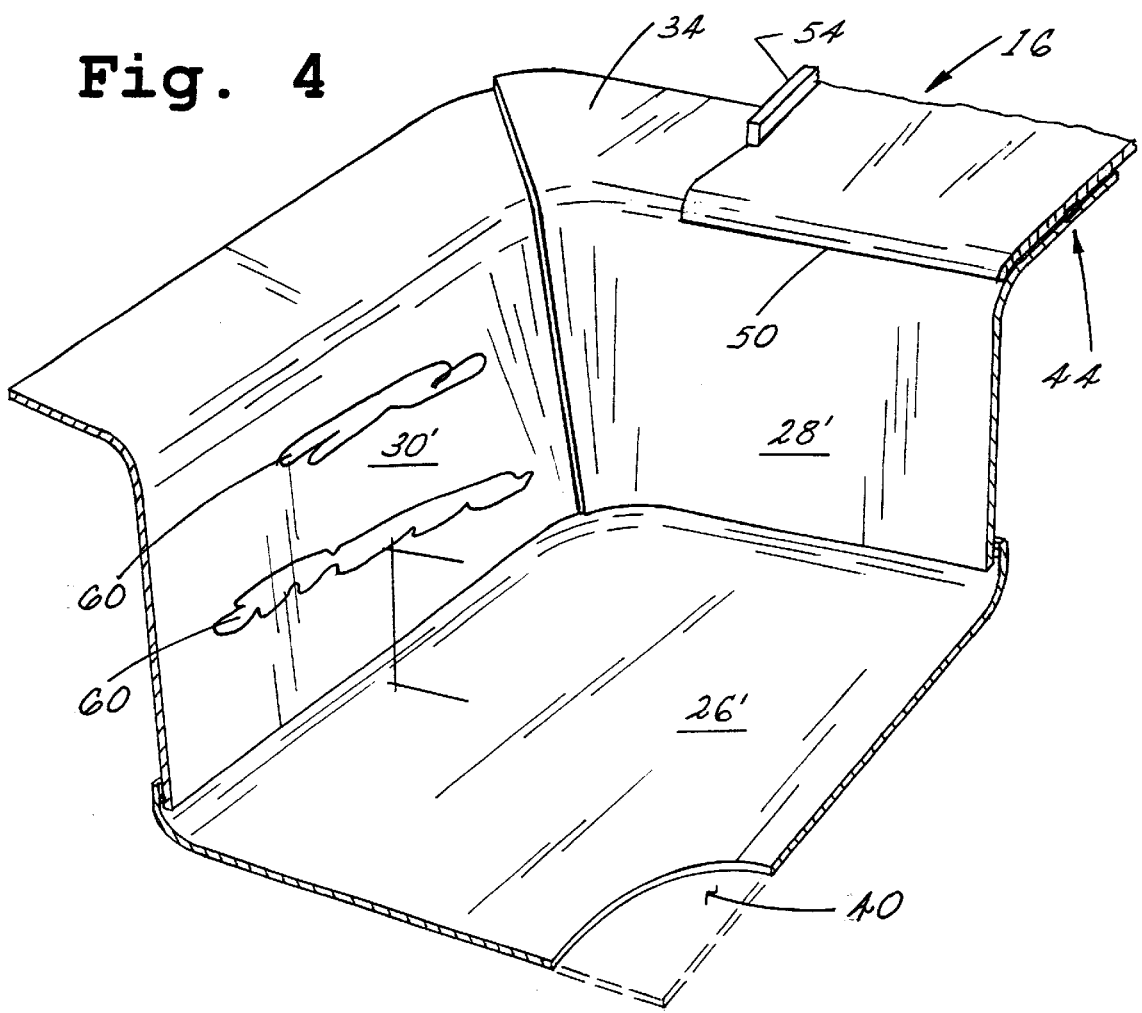
FIG. 4 is a sectional perspective view of the sink hugger of FIG. 3.

A second arrangement of the liner of the invention is shown in FIGS. 3 and 4. Here liner 14' is shown as being formed of a plurality of individual pieces which are designed to overlie each other at their edges and be interconnected by connectors or securing members. More particularly, liner bottom 26' is shown as a rectangular member shaped to correspond with the sink bottom and includes a securing member 44 along each of its edges. There are provided four panels 28', 29', and 30' which are also carry securing members 44 along their side and bottom edges. As shown securing members 44 are positioned along the upper surface of bottom 26' and front and rear side panels 30' while end panels 28', 29' have securing elements attached along their lower surface edges.

Side panels 28', 29', and end panels 30' are configured so that when they are placed in the sink. The configuration of the panels is such as to cover completely all exposed surface areas of the sink. This requires that the panels are formed into a semi-edge shape as shown. As best shown in FIGS. 4–6, adjacent edges of panels 28' 29', and 30' overlap and are secured by securing members 44. Likewise, lower edges of the panels overlay the outer edges of bottom panel 26' and are also secured by securing members 44.

The exposed surfaces of the panels may contain design schemes as indicated at 60 in FIG. 4. These schemes may be selected to any desired form.

Again panels 28' and 30' are formed with a flared upper edge 34' which, when liner 14' is in position in the sink, extend outwardly a sufficient distance to cover flange 22 of the sink and a portion of the counter in the manner previously described. The flared upper edge of outer side panels 28' also include securing member 44 which are designed to engage with a mating securing member 44 of side board 16 in the manner earlier described.

Securing members 44 preferably comprise an elongated protruding strip 48 which is adapted to pressure fit into an elongated channel 46. The engagement of these locking members provides a secure engagement between the panel edges and provides a watertight seam.

It is noted that other types of securing mechanisms may be provided such as magnetic strips or hook and loop strips. The only requirement is that the seal produced be sufficient to prevent seepage which can cause staining.

It is noted that the material forming the sink liner of the invention must be pliable, must be moldable into the desired configurations, and must be heat resistant at least up to 212° F. The material must present a smooth or slick outer surface which resists cuts and to which food does not easily attach. Also it is desirable that the material be stain resistant and capable of receiving design images.

While a preferred embodiment of the invention has been described using specific terms, such description is for illustrative purposes only, and it is to be understood that changes and variations may be made without departing from the spirit or scope of the following claims.

What is claimed is:

1. A removable protective liner for use with a sink mounted in a counter top, said sink being substantially rectangular and having a bottom with a drain hole, four upstanding walls and a peripheral flange overlaying adjacent edges of said counter top, said liner comprising:

a bottom panel of a size conforming with said sink bottom;

four upstanding side panels of a size conforming with respective of said sink upstanding walls and an adjacent portion of said peripheral flange, each said side panel engaging with a respective side of said bottom panel at least when positioned within said sink;

a side drain having a pair of side walls, an elevated outer end, an inner end, and a bottom interconnecting said side walls and extending from said elevated outer end to said inner end, said inner end of said side drain being engaged with an outer edge of a side panel to extend over said peripheral flange;

attachment members detachably connect said side drain with said outer edge of said side panel;

said attachment members comprise a shaped projection connected with one of said side panel and said side drain and a shaped receiving channel connected with the other of said side panel and said side drain; whereby, said liner, may be positioned within said sink to completely cover and protect its outer surface with said side drain covering and protecting an adjacent outer surface of said counter top.

2. The protective liner of claim 1 wherein said bottom panel and said four upstanding side panels are formed integral.

3. The protective liner of claim 1 wherein releasable securing members secure said protective liner with said sink.

4. The protective liner of claim 3 wherein said securing members are at least one of suction cups and magnetic members.

5. The protective liner of claim 1 wherein said bottom panel and said four upstanding side panels are each separate and individual members.

6. The protective liner of claim 5 wherein an edge of each of said four upstanding side panels overlap a respective edge of said bottom panel where they engage.

7. The protective liner of claim 6 including securing members securing said overlapping side panel edges in position.

8. The protective liner of claim 7 wherein said securing members are one of hook and loop members, magnetic members, projection-channel members, and suction cups.

9. The protective liner of claim 5 wherein said upstanding panels each comprise opposed sides, said sides being contoured so that adjacent ones overlap along their entire length when said liner is positioned within said sink.

10. The protective liner of claim 9 including securing members securing said overlapping side panel edges in position.

11. The protective liner of claim 10 wherein said securing members are one of hook and loop members, magnetic members, projection-channel members, and suction cups.

12. The protective liner of claim 1 wherein said bottom panel includes an opening positioned to overlie said drain hole, said opening including a downwardly projecting lip which extends into said drain hole.

13. The protective liner of claim 12 wherein said opening is of a size which provides that said projecting lip fits snugly into said drain hole.

14. The protective liner of claim 1 wherein said sink is a double sink and said liner is configured to cover said sink of said double sink.

15. The protective liner of claim 14 wherein said liner includes a pair of said side drains.

16. The protective liner of claim 1 wherein exposed surfaces of said panels contain design schemes.

17. The protective liner of claim 1 wherein said liner is formed of a heat resistant, pliable, non-porous synthetic material.

18. A removable protective liner in combination with a sink mounted in a counter top, said sink being substantially rectangular and having a bottom with a drain hole, four upstanding walls and a peripheral flange overlaying adjacent edges of said counter top, said combination comprising:

a bottom panel located in said sink bottom, said bottom panel having four edges and being configured to substantially conform with said sink bottom, said bottom panel including fastening members secured with its upper surface and extending along each edge of said four edges and a drain opening aligned with the drain hole of said sink;

four side panels, each side panel of said four side panels covering a respective of said upstanding walls and having a lower edge carrying a fastening member which is adapted to engage with a respective one of said edge fastening members of said bottom panel, said fastening members forming a watertight seal between said side panels and said bottom panel;

each said side panel including opposed contoured side edges, each said side panel edge carrying a fastening member and opposed said side panel edges being in overlaying positions with said fastening members engaged forming a watertight seal between each of said side panels;

each said side panel including an upper end which overlays said sink flange and an adjacent portion of said counter, said upper end of at least one of said side panels including an attachment member adapted to removably secure said upper end with said sink ledge; whereby, said protective liner protects said sink from staining, chipping and scratching.

* * * * *